Figure 1:
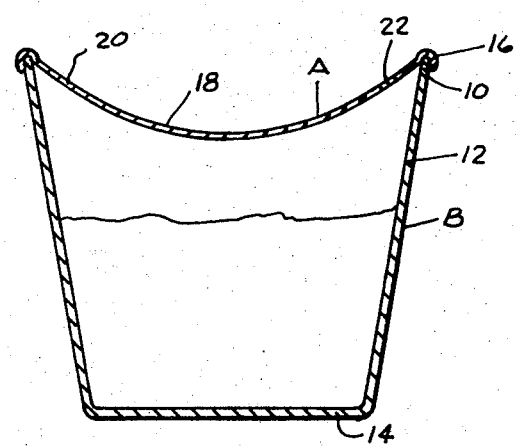

United States Patent
Barnett

[11] 3,806,023
[45] Apr. 23, 1974

[54] LID FOR HOT LIQUID DRINKING CUP

[76] Inventor: William J. Barnett, 816 Rollingwood Dr., Greensboro, N.C. 27410

[22] Filed: July 12, 1972

[21] Appl. No.: 271,144

[52] U.S. Cl............... 229/43, 220/90.2, 220/90.4, 229/1.5 B
[51] Int. Cl............................................. B65d 5/64
[58] Field of Search............... 229/1.5 B, 1.5 C, 43; 220/90.2, 90.4, 90.6

[56] References Cited
UNITED STATES PATENTS

| 3,428,236 | 2/1969 | Bidwell | 229/43 |
| 2,765,639 | 10/1956 | Bryant | 220/90.4 |
| 3,556,341 | 1/1971 | Rains | 220/90.4 |
| 2,601,767 | 7/1952 | Wall | 220/90.4 |
| 1,254,251 | 1/1918 | Magnus | 220/90.4 |

Primary Examiner—William I. Price
Assistant Examiner—Stephen P. Garbe
Attorney, Agent, or Firm—Bailey & Dority

[57] ABSTRACT

A lid for hot drink cups which has a concave main body portion onto which the hot liquid can be poured from the cup for the purpose of cooling. A flange extends inwardly from adjacent an outer edge of the main body portion towards the center of the lid for acting as a barrier to the liquid being poured from a hole provided in the lid on top of the cup.

2 Claims, 3 Drawing Figures

PATENTED APR 23 1974 3,806,023

LID FOR HOT LIQUID DRINKING CUP

This invention relates to a lid for hot drink cups, and more particularly to a concave lid that acts like a saucer for collecting and cooling liquid.

In recent years cups with very high insulation characteristics have been developed for serving hot drinks, such as coffee, in order to maintain the coffee hot for longer periods of time. The insulation quality of these cups, which may be constructed of polystyrene or other suitable types of materaial, have been so effective in maintaining the heat of the coffee that it becomes a problem for some people who are sensitive to hot drinks. As a result, when steaming hot coffee is poured into the cup they must wait a considerable length of time in order for the coffee to cool to a degree that will permit them to drink such comfortably.

Accordingly, it is an important object of the present invention to provide a lid for a cup which acts as a saucer for cooling a portion of the liquid contained in the cup.

Another important object of the present invention is to provide a lid for hot drink cups which has a hole positioned therein above a concave portion for allowing the hot liquid to be poured onto the lid for cooling.

Still another important object of the present invention is to provide a lid for hot drink cups which has a flange extending over a concave main body portion which acts as a barrier for liquid being poured from the cup for directing the liquid onto the top of the lid.

The construction designed to carry out the invention will be hereinafter described, together with other features thereof.

Figure 2:
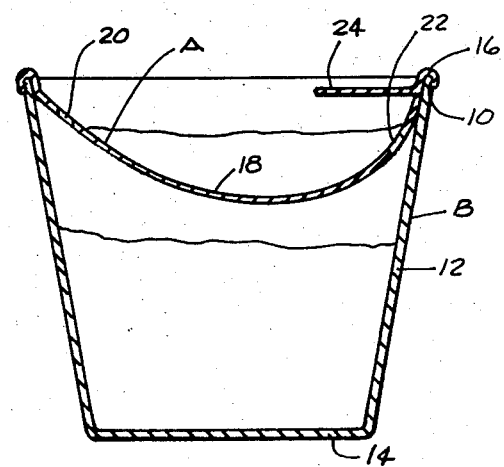
Figure 3:
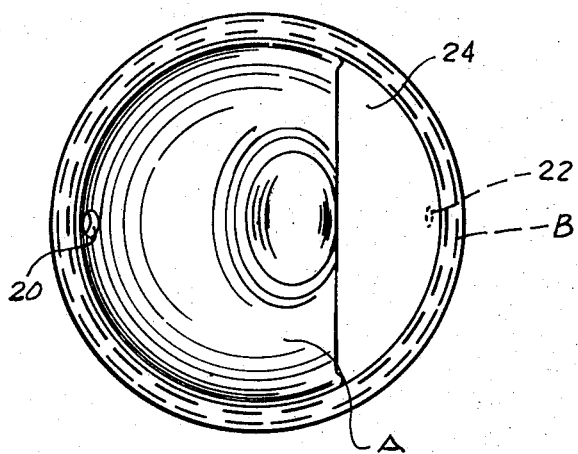

The invention will be more readily understood from a reading of the following specification, and by reference to the accompanying drawing forming a part thereof wherein:

FIG. 1 is an elevational view, in section, showing a lid constructed in accordance with the present invention mounted on a cup, FIG. 2 is an elevational view, in section, showing a modified form of the lid constructed in accordance with the present invention, and FIG. 3 is a plan view of the lid shown in FIG. 2.

Referring in more detail to the drawing, there is illustrated a lid A being positioned on a conventional insulated cup B which has a generally circular open top with a rim extending therearound. The lid A includes a circular main body portion for spanning the open top of the cup. A downwardly turned flange means is integral with the periphery of the main body portion, and extends over the rim of the cup for securing the lid on the cup B. The main body portion of the lid is concave and extends downwardly below the rim of the cup for defining a saucer-like receptacle. A pair of diametrically spaced holes are provided in the main body portion between the rim and the body of the saucer-like receptacle. Thus, when a hot liquid is carried in the cup, the cup can be tilted for allowing the liquid to flow through one of the holes onto the saucer-like lid A.

The cup B may be any conventional drinking cup, such as is commonly used for hot coffee and the like, and constructed of a synthetic insulating material such as polystyrene. The cup has a circular open top with a rim 10 extending therearound. The side wall or body of the cup 12 is tapered so that the lower end thereof is of a smaller diameter than the open top. A flat bottom 14 is integral with the side wall 12 of the cup.

The lid A has a downwardly turned flange 16 integral with the periphery of a main body portion 18 for extending over the rim 10 of the cup for securing such thereto. The main body portion 18 of the lid is concave and extends downwardly below the rim of the cup for defining a saucer-like receptacle. A pair of diametrically spaced holes 20 and 22 are provided in the main body portion between the flange means 16 and the bottom of the saucer-like receptacle. Therefore, when the cup is tilted the hot liquid is allowed to flow through one of the holes onto the saucer-like lid. The other hole acts as a vent hole. In some applications it may be desired to make the pouring hole larger than the vent hole.

FIG. 2 illustrates a modified form of the invention wherein the lid of the cup has a flange 24 which extends inwardly from adjacent the outer edge of the main body portion 18 towards the center of the lid. The flange 24 is closely adjacent the downwardly turned flange 16 directly above one of the holes 22. Thus, when the cup is tilted the hot liquid flows through the hole 22 and engages the flange-like barrier 24 which deflects the liquid onto the saucer-like lid 18 for cooling.

The lid may be constructed of any suitable conventional material used for lids for drink cups.

While a preferred embodiment of the invention has been described using specific terms, such description is for illustrative purposes only, and it is to be understood that changes and variations may be made without departing from the spirit or scope of the following claims.

What is claimed is:

1. A lid for a hot drink cup which has a generally circular open top with a rim extending therearound, said lid comprising a circular main body portion for spanning said open top of said cup, a downwardly turned flange means integral with the periphery of said main body portion for extending over said rim of said cup for securing said lid on said cup, said main body portion of said lid being concave extending downwardly below the rim of said cup for defining a saucer-like receptacle, a pair of diametrically spaced holes provided in said main body portion intermediate said rim and the bottom of said saucer-like receptacle, said concave portion below said spaced holes being imperforate, whereby when a hot drink is carried in said cup, the cup can be tilted for allowing said hot drink to flow through one of said holes onto said lid so as to cool faster.

2. The lid as set forth in claim 1 further comprising: a flange extending inwardly from adjacent an outer edge of said main body portion towards the center of said lid, said flange being closely adjacent said rim of said cup directly above one of said holes, whereby said flange acts as a barrier to the hot drink being poured through said hole in said lid for aiding in directing said hot drink onto said lid when said cup is tilted.

* * * * *